(12) United States Patent
Dahl

(10) Patent No.: US 8,393,799 B2
(45) Date of Patent: Mar. 12, 2013

(54) SPRING TRACK ROLLER ASSEMBLY

(75) Inventor: Bruce A. Dahl, Kent, WA (US)

(73) Assignee: The Boeing Company, Chicago, IL (US)

( * ) Notice: Subject to any disclaimer, the term of this patent is extended or adjusted under 35 U.S.C. 154(b) by 1220 days.

(21) Appl. No.: 12/361,461

(22) Filed: Jan. 28, 2009

(65) Prior Publication Data
US 2010/0187367 A1 Jul. 29, 2010

(51) Int. Cl.
*F16C 33/58* (2006.01)
(52) U.S. Cl. ........................................................ 384/569
(58) Field of Classification Search .................... 384/58, 384/59, 449, 563; 244/213
See application file for complete search history.

(56) References Cited

U.S. PATENT DOCUMENTS

| | | | |
|---|---|---|---|
| 2,912,288 A | 11/1959 | Griswold | |
| 3,097,896 A * | 7/1963 | Wasley | 384/482 |
| 3,869,181 A * | 3/1975 | Barber | 384/482 |
| 3,905,661 A * | 9/1975 | Orr | 384/563 |
| 3,951,244 A | 4/1976 | Neder | |
| 4,134,842 A | 1/1979 | Orkin | |
| 4,173,376 A | 11/1979 | Standing et al. | |
| 4,717,268 A | 1/1988 | Orkin | |
| 4,780,001 A * | 10/1988 | Werner | 384/206 |
| 4,780,003 A * | 10/1988 | Bauer et al. | 384/448 |
| 4,895,461 A * | 1/1990 | Stella | 384/454 |
| 4,921,362 A | 5/1990 | Werner | |
| 4,938,610 A * | 7/1990 | Kato | 384/126 |
| 5,056,938 A | 10/1991 | Ahlman et al. | |
| 5,082,387 A | 1/1992 | DeVries | |
| 5,094,412 A * | 3/1992 | Narramore | 244/214 |
| 5,110,222 A * | 5/1992 | Johnson et al. | 384/482 |
| 5,219,232 A * | 6/1993 | Adams et al. | 384/275 |
| 6,247,545 B1 | 6/2001 | Burr et al. | |
| 6,648,508 B1 * | 11/2003 | Brunk et al. | 384/57 |

OTHER PUBLICATIONS

Belleville washer. (posted Sep. 21, 2007). In Wikipedia, The Free Encyclopedia. Retrieved 23:26, Dec. 3, 2011, from http://en.wikipedia.org/w/index.php?title=Belleville_washer&oldid=159285352.*
RBC Bearings, Inc., "Solving Problems with Cam Followers," Brochures and Application Notes, available at <http://www.rbcbearings.com/literature/pdfs/RBC-ps-cf.pdf> last visited on Jan. 25, 2009.

* cited by examiner

*Primary Examiner* — Tien Dinh
*Assistant Examiner* — Michael Kreiner
(74) *Attorney, Agent, or Firm* — Novatech IP Law

(57) ABSTRACT

A roller assembly comprises a first race and a second race. The second race is coaxial with the first race and is axially movable relative to the first race. The first and second races are movable between a static axial position and a dynamic axial position relative to one another. The roller assembly includes at least one biasing member that is operative to bias the first and second races from the dynamic axial position toward the static axial position.

22 Claims, 7 Drawing Sheets

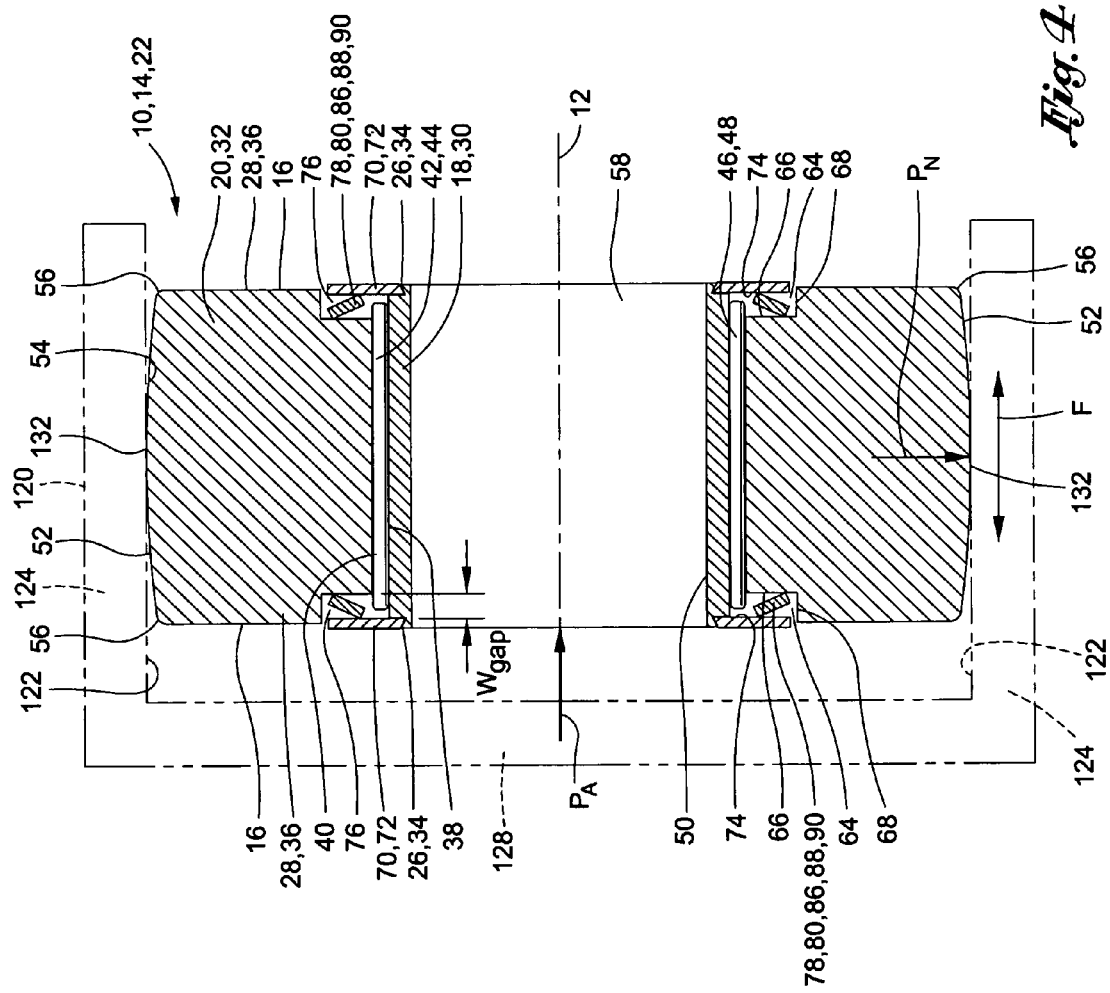

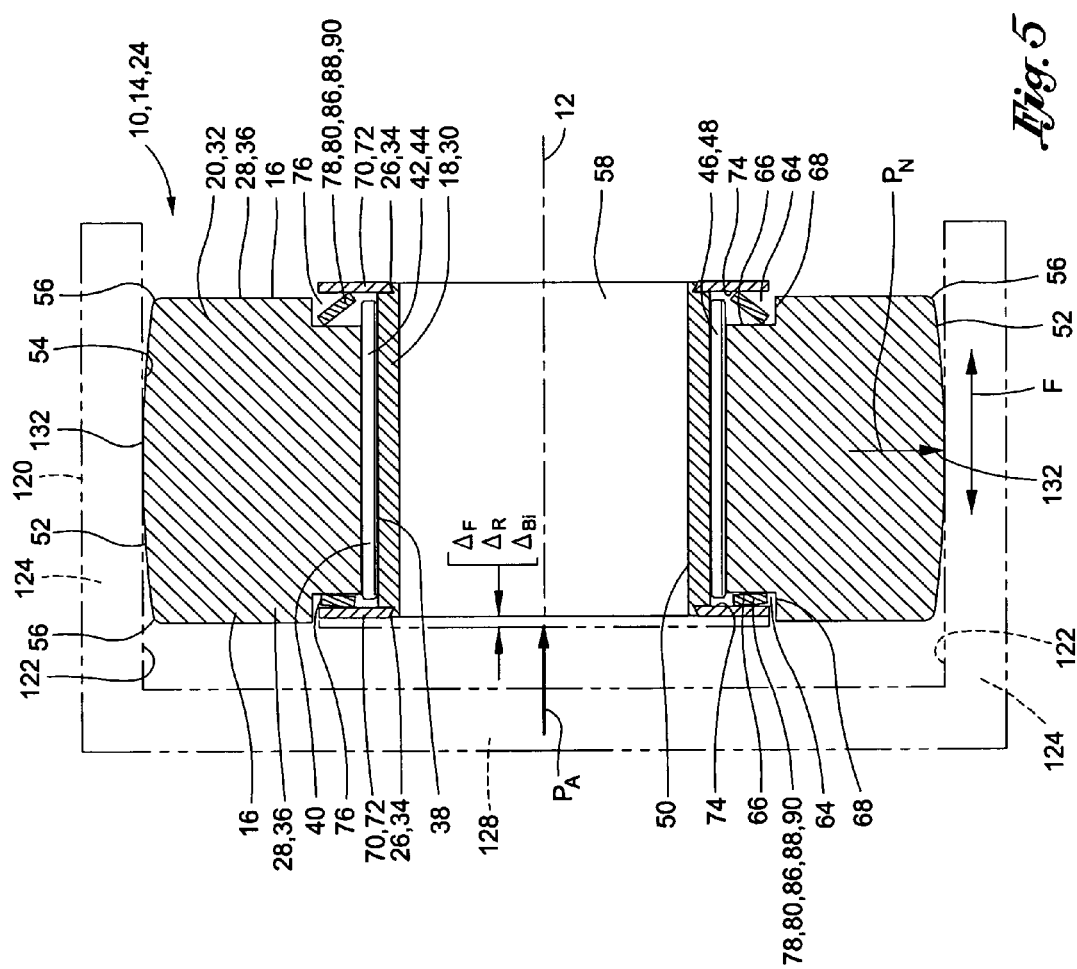

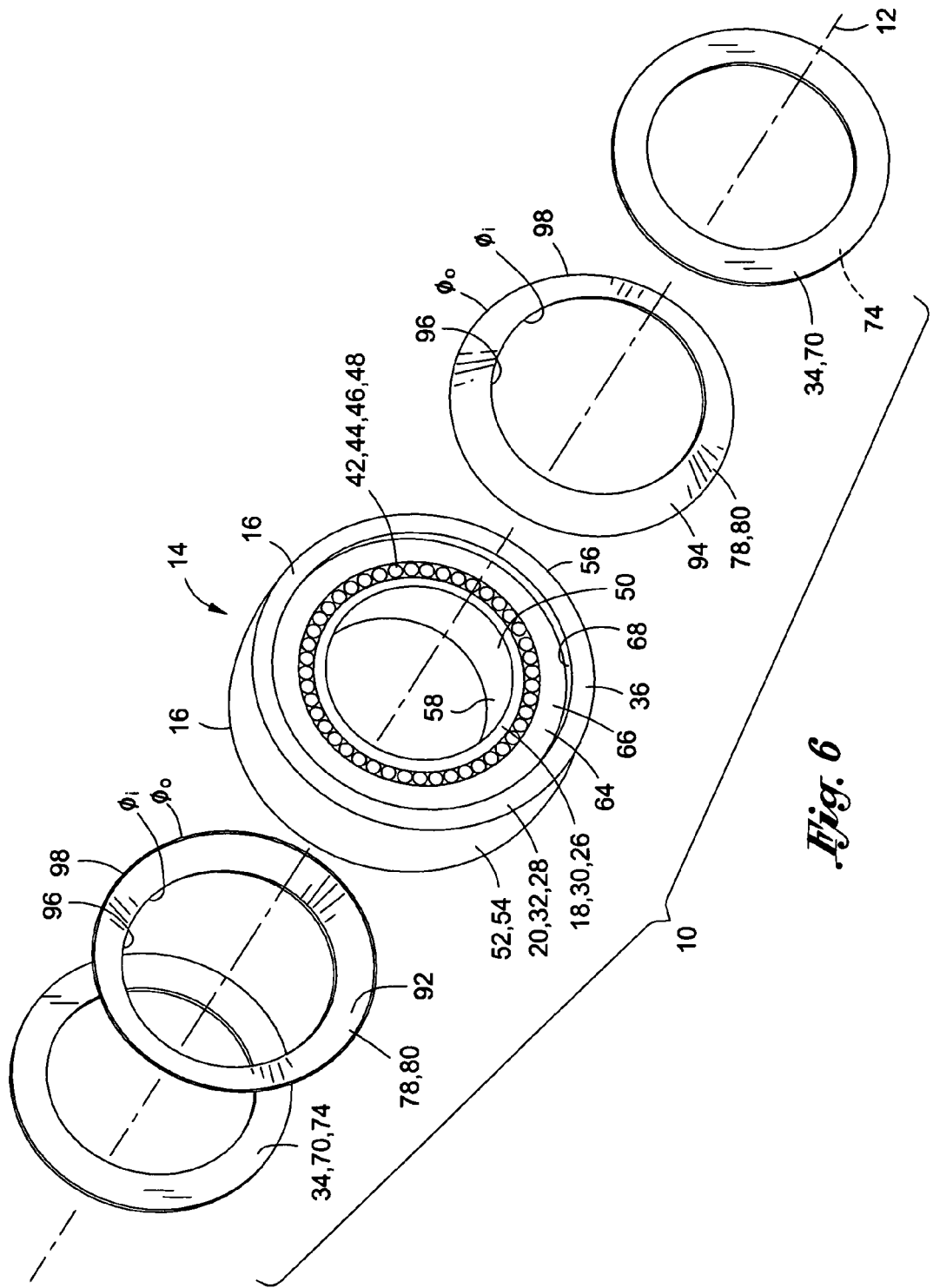

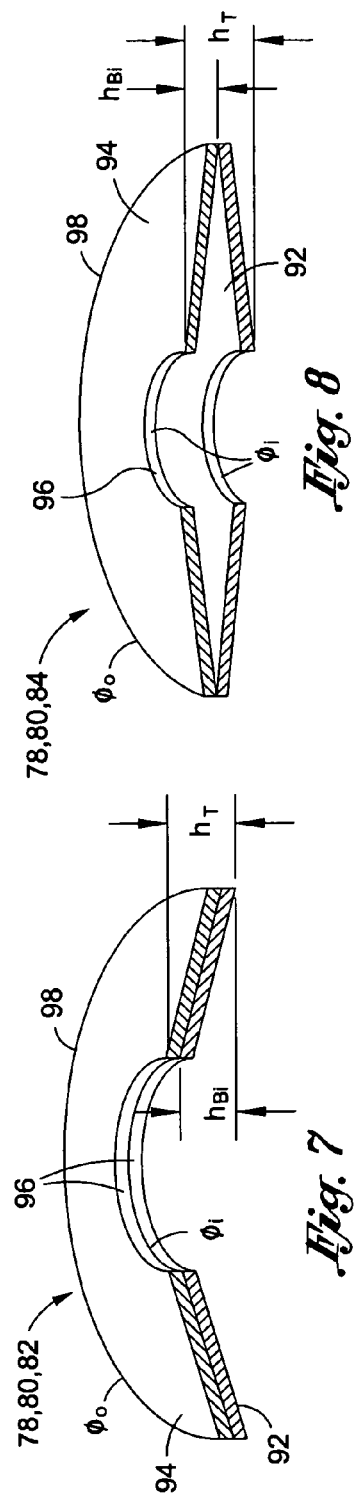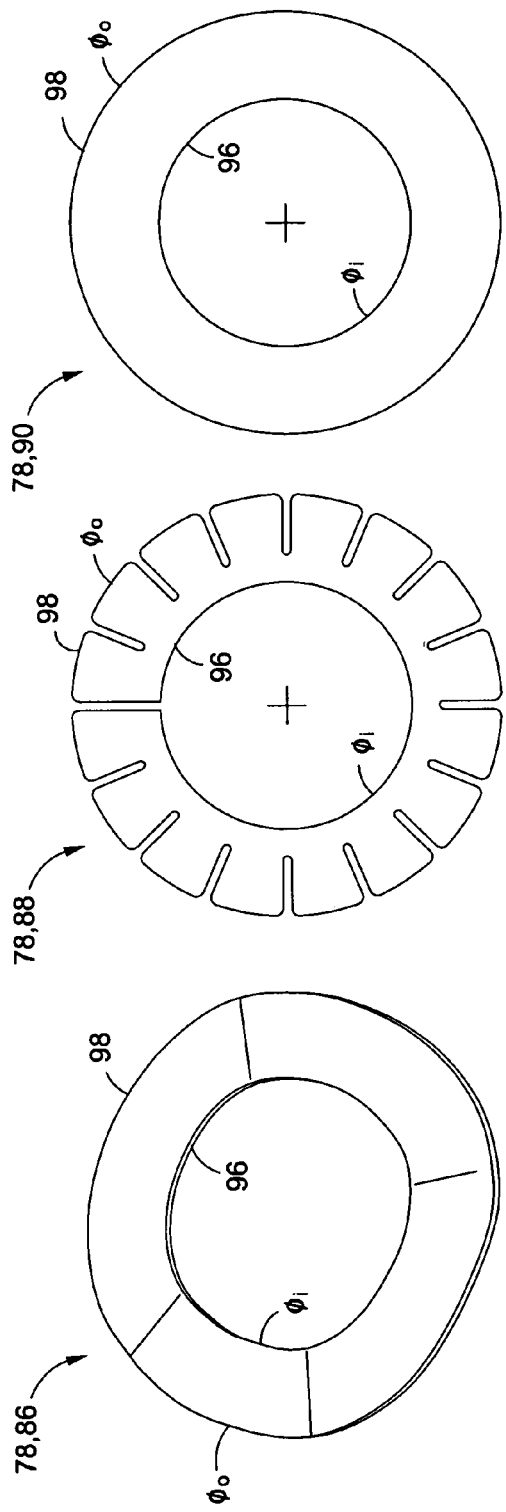

SPRING TRACK ROLLER ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to bearing assemblies and, more particularly, to track roller bearings that are configured to increase the service life of tracks as a result of a reduction in axial motion of the roller surface relative to the track surface.

BACKGROUND

Many aircraft include control surfaces that may be extendable from the leading and/or trailing edges of the aircraft wings. For example, many aircraft are fitted with wing flaps that may be extended from the wing trailing edges to increase the lift capability of the wings during takeoff and landing of the aircraft. Each trailing edge wing flap may be mounted to the wing by a pair of flap track assemblies which may be located near the inboard and outboard ends of each flap. The flap may be coupled to each track assembly by a flap carriage which is movable along a flap track of the track assembly.

The flap carriage may include one or more track roller bearings or roller assemblies that are in rolling contact with the flap track. The track assembly may further include a flap actuation mechanism for extending the flap away from the trailing edge to a desired flap setting and retracting the flap back toward the trailing edge. The flap actuation mechanism may comprise a motor coupled to a suitable drive mechanism such as a ballscrew. The ballscrew may include a drive screw affixed at one end to the motor and at an opposite end to a ball nut attached to the flap carriage. Rotation of the drive screw by the motor causes translation of the ball nut and flap carriage along the drive screw resulting in extension or retraction of the flap depending upon the direction of rotation of the drive screw.

During certain phases of flight, the flaps may be exposed to vibrational loading. For example, during takeoff and landing when the flaps are typically extended, a portion of the engine thrust may impinge upon the flaps causing the flaps to vibrate. Aerodynamic loading on the flaps may also contribute to vibration of the flaps. In addition to thrust impingement and/or aerodynamic loading, mechanical vibrations caused by engine operation and rough runway surfaces may also cause vibration of the flaps. The vibration of the flaps may be transmitted through the flap carriage to the roller assemblies which are supported by the flap track. Each roller assembly includes an outer roller surface which is in rolling contact with a track surface of the flap track. The vibrational motion of the flap causes axial motion of the roller surface which may result in a reduction in the service life of the track surface. In addition, axial motion of the roller surface relative to the track surface can result in an increase in maintenance costs and require repair of the track surface or replacement of the flap track.

Repair of the track surface to extend the operating life of the flap track may require the application of a high-hardness coating to the track surface. Unfortunately, the application of the high-hardness is a relatively expensive process requiring significant labor for removal of the track assembly from the aircraft, disassembly of the flap track from the track assembly, and re-working of the flap track to apply the high-hardness coating. Likewise, replacement of the flap track is also relatively expensive and time-consuming requiring removal of the track assembly, replacement of the damaged flap track with a new flap track and re-installation of the track assembly onto the aircraft. In addition, each of the above-described repair or replacement scenarios can result in significant aircraft downtime.

As can be seen, there exists a need in the art for a roller assembly of a track assembly that minimizes or eliminates axial motion of the outer roller surface relative to the track surface. Additionally, there exists a need in the art for a roller assembly that minimizes or prevents such relative axial motion of the outer roller surface and wherein the roller assembly is of low cost and simple construction.

BRIEF SUMMARY

The above-noted needs associated with roller assemblies of the prior art are specifically addressed and alleviated by the present disclosure which provides a roller assembly that is adapted to reduce or prevent axial motion of an outer roller surface of the roller assembly relative to a track surface to which the roller surface may be placed in rolling contact. The roller assembly includes a race assembly comprised of a first race and a second race that is coaxial with the first race. The first and second races may be rotatable about a roller axis.

The first race may comprise an inner race and the second race may comprise an outer race which has the roller surface that may be placed in rolling contact with the track surface. Alternatively, the second race may comprise the inner race and the first race may comprise the outer race having the roller surface that may be placed in rolling contact with the track surface. Advantageously, the first race is axially displaceable or movable relative to the second race between a neutral or static axial position and a dynamic axial position to accommodate a predetermined amount of relative axial motion of the first race relative to the second race between the static and dynamic axial positions. The roller assembly includes at least one biasing member to bias the first and second races from the dynamic axial position toward the static axial position and absorb the axial motion of the first race relative to the second race to prevent axial motion of the roller surface relative to the track surface.

The technical effects of the disclosed embodiments include an increase in the service life of the track surface and a reduction in maintenance costs. The biasing member facilitates controlled axial displacement of the first race relative to the second. The first and second races may be axially movable from the neutral or unbiased static axial position toward a dynamic axial position under the influence of an applied lateral load that may be exerted on the inner race.

For example, the roller assembly may be mounted to a flap carriage of a track assembly for guiding movement of a control surface such as, without limitation, a flap of an aircraft between retracted and extended positions. The flap may vibrate or move laterally as a result of dynamic loading on the flap from one or more external forces such as aerodynamic forces on the flap, engine thrust impingement on the flap or as a result of other forces that may induce lateral displacement or vibration in the flap. The lateral flap displacement may be applied as an axial load on the inner race. The roller assembly as disclosed herein facilitates controlled axial displacement of the inner race relative to the outer race in response to the applied axial load such that axial motion of the outer race relative to the track surface is reduced or prevented.

Although the roller assembly is described in the context of a control surface such as a flap, the roller assembly may be applied for use in any number of alternative arrangements and is not limited to use with a flap track for a control surface. The flap track may be configured as a track member of any suitable configuration for guiding the movement of a variety of alternative devices other than control surfaces. Further in this regard, the roller assembly may be applied to any arrangement, system, vehicle, building, assembly, subassembly, component or structure wherein one or more roller assemblies are engageable in rolling contact with one or more track surfaces. Additionally, the roller assembly may be mounted in any arrangement wherein it is desirable to reduce or prevent axial motion of the roller surface relative to the track surface.

The biasing member may comprise a pair of biasing members disposed on opposing lateral sides of the race assembly which is comprised of the inner and outer races. The biasing members may cooperate to axially bias the inner and outer races away from the dynamic axial position toward the static axial position. More specifically, each one of the biasing members may be configured to be resiliently compressible to axially bias one of the first race lateral sides away from an adjacent one of the second race lateral sides.

In one example, each one of the biasing members may be configured as a resiliently compressible, conically-shaped Belleville washer having inner and outer conical surfaces. However, the biasing members may be provided in alternative configurations including, but not limited to, a wave washer configuration, a spoke washer configuration, a ring-shaped layer of elastomeric material or in any other suitable configuration that may bias the inner and outer races toward the static axial position after the inner and outer races have been axially displaced to a dynamic axial position. Furthermore, in an alternative embodiment, the biasing members may be configured to be resiliently extendable or tensionable in order to bias the inner and outer races toward the static axial position from the dynamic axial position.

The features, functions and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

These and other features of the present invention will become more apparent upon reference to the drawings wherein like numbers refer to like parts throughout and wherein:

FIG. 4 is a sectional illustration of one of the roller assemblies having a second race (e.g., outer race) rotatably engaged to a first race (e.g., inner race) and further illustrating a pair of biasing members (e.g., Belleville washers) disposed on opposing lateral sides of the first and second races in a static axial position;

FIG. 5 is a sectional illustration of the roller assembly of FIG. 4 and illustrating the first and second races in a dynamic axial position and illustrating axial deflection of at least one of the biasing members (i.e., Belleville washer);

FIG. 6 is an exploded perspective view of the roller assembly illustrating the interconnectivity of a pair of side washers and the biasing members on opposing lateral sides of the first and second races;

FIG. 7 is a sectional perspective view of the biasing member configured as a stack of Belleville washers arranged in parallel;

FIG. 8 is a sectional perspective view of the biasing member configured as a stack of Belleville washers arranged in series;

FIG. 9 is a perspective view of the biasing member configured as a wave washer;

FIG. 10 is a plan perspective view of the biasing member configured as a spoke washer; and FIG. 11 is a plan view of the biasing member configured as a ring-shaped layer of elastomeric material.

DETAILED DESCRIPTION

Figure 1:
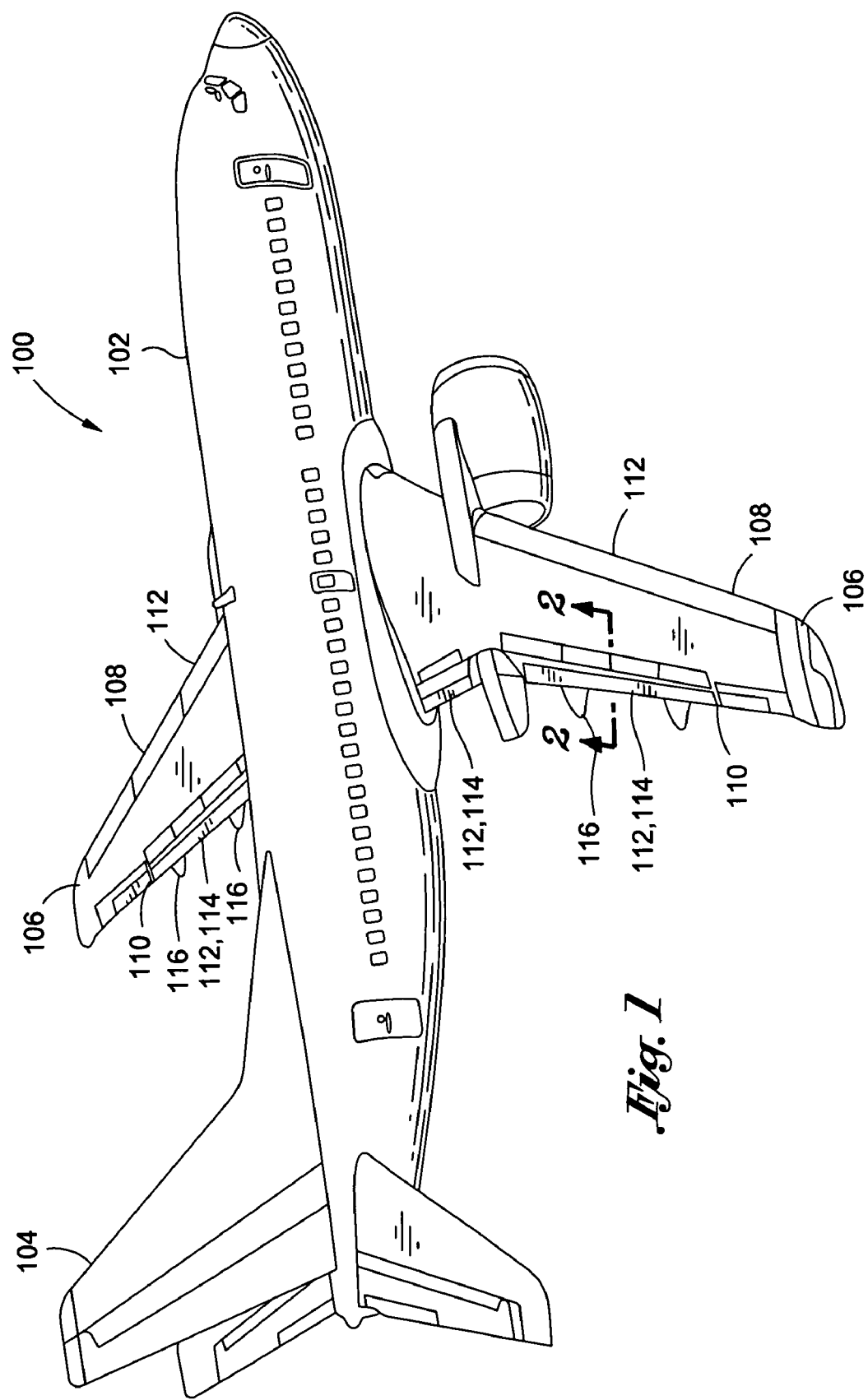
FIG. 1 is a perspective illustration of an aircraft having a pair of wings and including one or more flaps mounted thereto by means of one or more flap track assemblies incorporating one or more roller assemblies.

Referring now to the drawings wherein the showings are for purposes of illustrating preferred and various embodiments of the disclosure only and not for purposes of limiting the same, shown in FIG. 1 is a perspective illustration of an aircraft 100 which may employ one or more roller assemblies 10 as disclosed herein. The roller assembly 10 is adapted to reduce or prevent axial motion of an outer roller surface 52 of the roller assembly 10 relative to a track surface 122 to which the roller surface 52 may be placed in rolling contact. By reducing or eliminating axial motion of the roller surface 52 relative to the track surface 122, the service life of the track surface 122 may be increased.

Referring briefly to FIG. 4, the roller assembly 10 may include a first race 18 and a second race 20 that is coaxial with the first race 18. The second race 20 may be rotatable about a roller axis 12 relative to the first race 18. The first and second races 18, 20 comprise a race assembly 14 of the roller assembly 10. The race assembly 14 has opposing race assembly lateral sides 16. Notably, the first race 18 is axially (i.e., laterally) displaceable or movable relative to the second race 20 and includes at least one biasing member 78 configured to absorb axial motion of the first race 18 relative to the second race 20. In this manner, the biasing member 78 facilitates controlled axial displacement of the first race 18 relative to the second race 20 to increase the service life of the track surface 122 to which the roller assembly 10 may be engaged.

The biasing member 78 may comprise one or more biasing members 78 such as a pair of biasing members 78. The pair of biasing members 78 may be positioned on respective ones of the race assembly lateral sides 16. The pair of biasing members 78 may cooperate to absorb or dampen the relative axial motion of the first and second races 18, 20 for controlled axial displacement of the first race 18 relative to the second race 20 regardless of whether the roller assembly 10 is in rolling engagement with the track surface 122 or is stationary (i.e., non-rolling) with respect to the track surface 122.

As is known in the art, roller assemblies 10 typically comprise an outer race 32 that is coaxial with and rotatable relative to an inner race 30. The outer race 32 typically includes a roller surface 52 that is positionable in rolling contact with a track surface 122. The inner race 30 may be fixedly or nonrotatably mounted on an axle 134 although the inner race 30 may be rotatably mounted on the axle 134. The outer race 32 may be rotatable relative to the inner race 30 regardless of whether the inner race 30 is fixedly mounted to the axle 134 or rotatably mounted to the axle 134. However, it is also contemplated that the outer race 32 may be non-rotatable relative to the inner race 30 such that the inner and outer races 30, 32 may rotate in unison. Regardless of the relative rotatability of the inner and outer races 30, 32 (e.g., the first and second races 18, 20), the inner race 30 is axially movable relative to the outer race 32 to reduce or prevent axial motion of the roller surface 52 relative to the track surface 122 to which the roller surface 52 may be placed in rolling contact.

In an embodiment of the roller assembly 10 as disclosed herein, the second race 20 may comprise the outer race 32 and the first race 18 may comprise the inner race 30 such that the second race 20 is the outermost one of the first and second races 18, 20. In such arrangement, the second race 20 includes the outer roller surface 52 which may be placed in rolling contact with the track surface 122.

Figure 2:
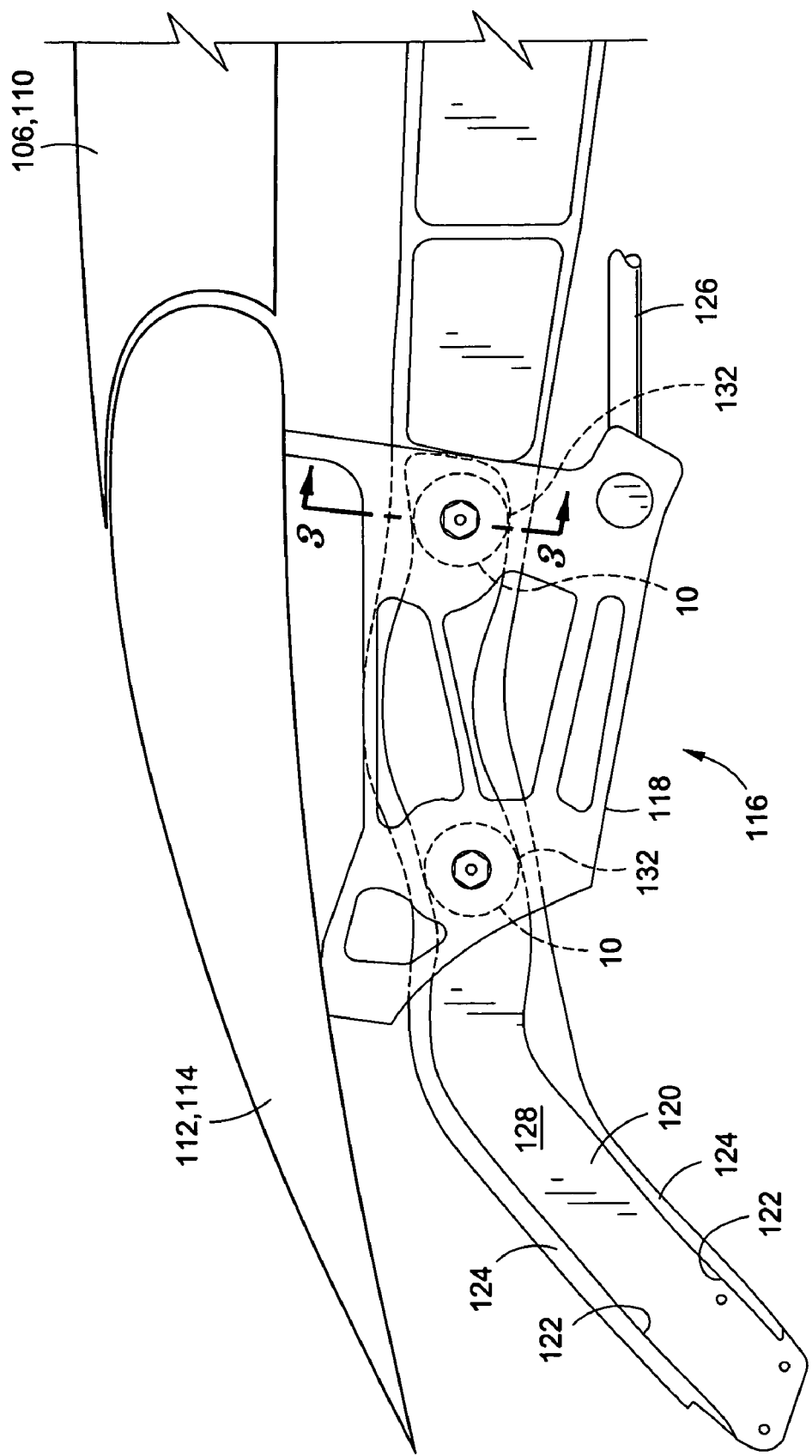
FIG. 2 is a sectional illustration of a trailing edge of the wing taken along line 2-2 of FIG. 1 and illustrating a flap carriage having a pair of roller assemblies engaged to a flap track of the track assembly.
Figure 3:
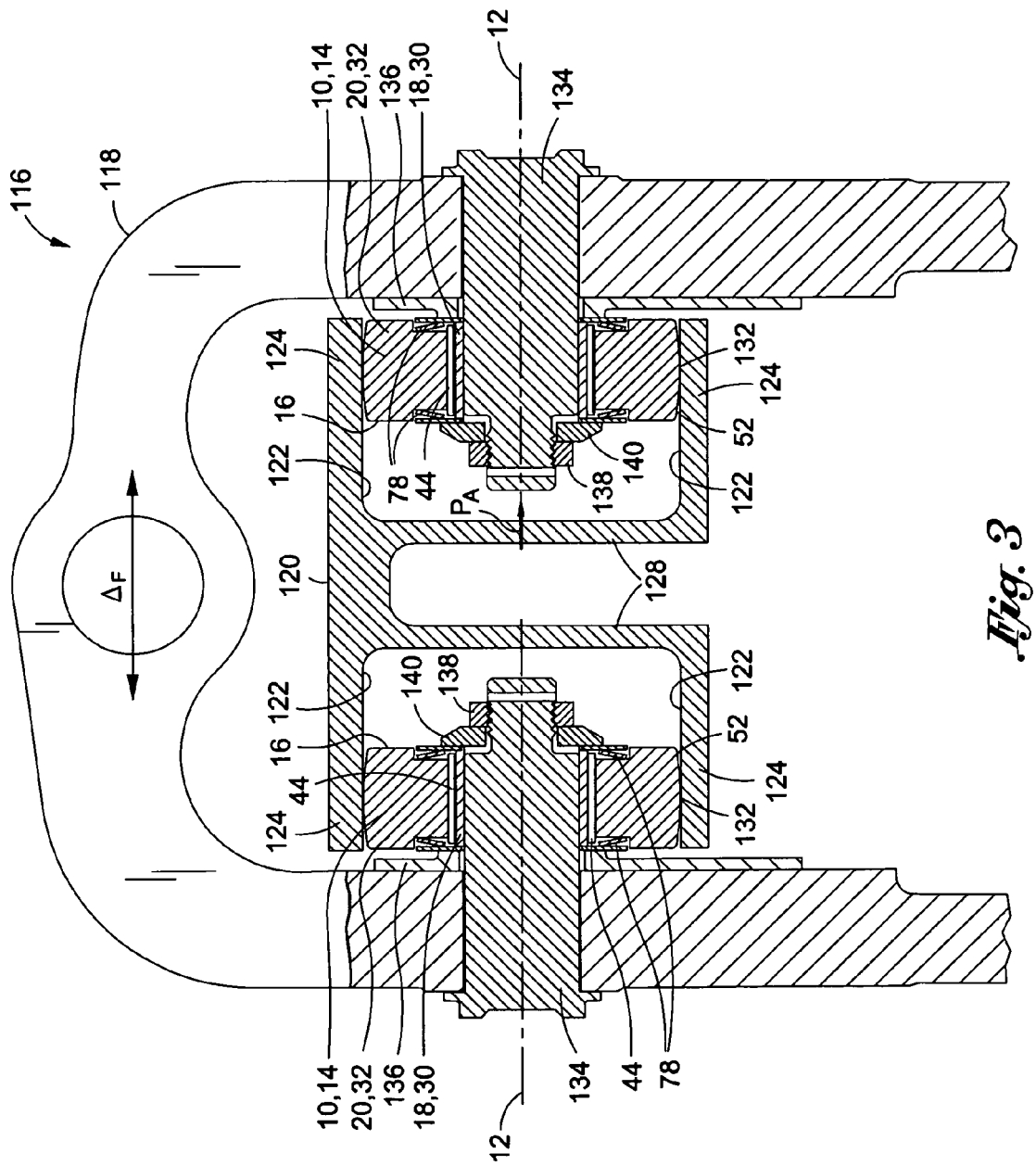
FIG. 3 is a sectional illustration of the track assembly taken along line 3-3 of FIG. 2 and illustrating the interconnectivity of the roller assemblies to the flap track.

For example, referring to FIGS. 1-3, the roller assembly 10 may be placed in rolling engagement with a flap track 120 of a track assembly 116 as known in the art and which is commonly used for guiding the movement of a control surface 112 such as a flap 114 of an aircraft 100. As shown in FIG. 1, the aircraft 100 may have a fuselage 102 and a tail section 104 and may include wings 106 which may be fitted with one or more control surfaces 112 on a leading edge 108 and/or trailing edge 110 of the wing 106. For example, the aircraft 100 may include one or more flaps 114 which may be positioned at the trailing edge 110 of each wing 106. Each one of the flaps 114 may be supported by one or more of the track assemblies 116 that may be mounted to the wing 106 such as at the inboard and outboard ends of each flap 114.

As shown in FIGS. 2-3, each track assembly 116 as known in the art may include means for extending the flap 114 away from the trailing edge 110 to a desired flap setting and for retracting the flap 114 back toward the trailing edge 110. For example, a motor (not shown) may be operatively coupled to the flap 114 by a ballscrew 126 which may be coupled to a flap carriage 118. Rotation of the ballscrew 126 by the motor causes translation of the flap carriage 118 resulting in extension or retraction of the flap 114 to a desired flap setting depending upon the direction of rotation of the ballscrew 126. The flap carriage 118 may be supported by one or more of the roller assemblies 10 which may be movable along the flap track 120 of the track assembly 116. The flap track 120 may comprise one or more track flanges 124 such as upper and lower track flanges 124 illustrated in FIG. 2. The upper and lower track flanges 124 may be interconnected by a track web 128. The arrangement of upper and lower track flanges 124 and the interconnecting track web 128 may be disposed in mirror image on left-hand and right-hand sides of the track assembly 116. However, the flap track 120 may be configured in any number of alternative arrangements and is not limited to the flap track 120 configuration illustrated in FIGS. 2-3.

As shown in FIGS. 3-5, each one of the track flanges 124 may include a track surface 122 to which one or more of the roller assemblies 10 may be engaged. Each roller assembly 10 may be engaged to the track surface 122 at a roller-track interface 132 defined by the area or point of contact between the roller surface 52 and the track surface 122. The roller surface 52 may be provided in any suitable shape between peripheral edges 56 such as in a cylindrical shape or with a crown radius 54 as known in the art and as shown in FIGS. 3-5.

Referring to FIG. 3, in an embodiment, each one of the roller assemblies 10 may be mounted to the flap carriage 118 by an axle 134 which may be engaged to the flap carriage 118 and which may extend through a bore 58 formed in the race assembly 14. In this regard, the flap carriage 118 may connect the flap 114 to the axle 134 and to the roller assembly 10. The bore 58 may be formed in the inner race 30 of the race assembly 14. Each one of the roller assemblies 10 may be positionable in abutting contact with the flap carriage 118 by means of an axle flange 136 positioned on one of the opposing race assembly lateral sides 16. An axle washer 140 may be disposed on an opposite one of the race assembly lateral sides 16 and an axle nut 138 may be threadably engaged to the axle 134 to secure the roller assembly 10 to the flap carriage 118 or other structural element.

Although the roller assembly 10 may be mounted to the flap carriage 118 using the axle, 134, axle nut 138 and axle washer 140 arrangement described above, the roller assembly 10 may be mounted to the flap carriage 118 using any suitable arrangement that facilitates axial movement of the inner race 30 relative to the outer race 32. Further in this regard, it should be noted that although the roller assembly 10 is described in the context of a flap track 120 for use in an aircraft 100, the roller assembly 10 may be employed in any arrangement, application, system, vehicle, building, assembly, subassembly, component or structure wherein one or more roller assemblies 10 are engageable in rolling contact with one or more track surfaces 122. Moreover, the roller assembly 10 may be mounted in any arrangement wherein it is desirable to reduce or prevent axial motion of the roller surface 52 relative to the track surface 122 by facilitating axial movement of the inner race 30 relative to the outer race 32.

Referring to FIGS. 4-6, in an embodiment of the roller assembly 10, the bearing member 44 may comprise a plurality of elongate, cylindrically-shaped and axially-aligned needle rollers 46 as known in the art and which may be mounted within the radial gap 42. However, the bearing member 44 may comprise any suitable bearing element configuration that may be installed in the radial gap 42 and which facilitates rotation of the outer race 32 relative to the inner race 30. For example, the bearing member 44 may comprise a low friction layer of material 48 such as urethane, polyethylene, Teflon, graphite-embedded fabric or any other suitable woven or non-woven metallic or non-metallic material or combinations thereof.

The first and second races 18, 20 may be fabricated of any metallic or non-metallic material or combination thereof having suitable mechanical properties such as high wear resistance and suitable load capability. For example, the first and/or second races 18, 20 may be fabricated of a corrosion resistant material such as stainless steel having a predetermined material hardness. In addition, the roller surface 52 of the first or second race 18, 20 may be fabricated of a material that is compatible with the track surface 122 or the roller surface 52 may include a coating that is compatible with the track surface 122. In addition to metallic materials, the first and second races 18, 20 may be fabricated of composite materials including, but not limited to, composites, carbon mixes, elastomeric material or any other material having suitable properties such as high wear resistance, load capability and corrosion resistance.

As was indicated above with reference to FIGS. 3-5, the first race 18 is axially movable relative to the second race 20 in order to reduce or prevent axial motion of the roller surface 52 relative to the track surface 122. For configurations where the first race 18 comprises the inner race 30 and the second race 20 comprises the outer race 32, the first race 18 may be mounted to the flap carriage 118 which may be subjected to lateral vibration or lateral flap 114 displacement indicated by $\Delta_F$. In an embodiment of the roller assembly 10, the first and second races 18, 20 may be axially movable from a neutral or static axial position 22 such as that which is shown in FIG. 4 to a dynamic axial position 24 such as that which is shown in FIG. 5. As was indicated above, the roller assembly 10 may include a pair of the biasing members 78 which may cooperate to bias the first and second races 18, 20 toward the static axial position 22 whenever the first race 18 is axially displaced relative to the second race 20 toward the dynamic axial position 24 such as that shown in FIG. 5.

As illustrated in FIG. 4, the biasing members 78 may maintain the first race 18 in a neutral or non-biased position relative to the second race 20. Although the first race 18 is illustrated in FIG. 4 as being generally axially centered or aligned relative to the second race 20, it is also contemplated that the static axial position 22 may comprise an arrangement wherein the first race 18 is asymmetrically positioned to one side or the other (i.e., off center) relative to the second race 20. In this regard, the static axial position 22 may comprise any axial position of the first race 18 relative to the second race 20 that results in a null or neutral collective biasing force of the biasing members 78. In contrast, the dynamic axial position 24 may comprise any axial position of the first race 18 relative to the second race 20 wherein at least one of the biasing members 78 exerts a biasing force to urge the first and second races 18, 20 toward the neutral (i.e., unbiased) static axial position 22.

In an embodiment of the roller assembly 10 in the static axial position 22, the biasing members 78 on each of the race assembly lateral sides 16 may be pre-loaded or compressed such that the biasing members 78 exert equal biasing forces in opposite axial directions when the first and second races 18, 20 are in the static axial position 22. However, the roller assembly 10 may be configured such that the biasing members 78 are installed in an unloaded arrangement wherein the static axial position 22 comprises any axial position of the first race 18 relative to the second race 20 wherein the biasing members 78 remain unloaded. In this regard, the first race 18 may be axially movable to a limited extent relative to the second race 20 until at least one of the biasing members 78 is axially deflected and/or until a biasing force is generated by one of the biasing member 78 to place the roller assembly 10 into the dynamic axial position 24 whereupon one or more of the biasing members 78 urges the first and second races 18, 20 back toward the static axial position 22.

Referring to FIGS. 4-6, the first race 18 may include an opposing pair of first race lateral sides 26 which may be defined by an opposing pair of first race side walls 34. Likewise the second race 20 may include an opposing pair of second race lateral sides 28 which may be defined by an opposing pair of second race side walls 36. The roller assembly 10 may be configured such that each one of the biasing members 78 is configured to axially bias one of the first race lateral sides 26 away from an adjacent one of the second race lateral sides 28 such that the first and second races 18, 20 are biased toward the static axial position 22 whenever the first race 18 is axially displaced relative to the second race 20.

In an embodiment of the roller assembly 10, the first race 18 (e.g., the inner race 30) may include a pair of side washers 70 disposed on respective ones of the opposing first race lateral sides 26. One or both of the side washers 70 may be formed as separate components that may be mounted to the first race lateral sides 26 and which may form the first race side walls 34. However, at least one of the side washers 70 may comprise an annular flange 72 that may be integrally formed with the first race 18 and may project radially outwardly from the first race 18. The first race 18 may have a U-shaped cross-section as shown in FIGS. 4-5. At least one of the side washers 70 may be removably mounted to the first race 18 to facilitate assembly and maintenance of the roller assemblies 10 although the roller assembly 10 may be configured such that the side washers 70 are fixedly mounted to the first race 18 such as by mechanical attachment, welding, bonding or by any other suitable permanent attachment mechanism. Furthermore, the side washers 70 are not limited to the ring-shaped arrangement shown but may be provided in any other suitable configuration against which the biasing member 78 may bear to axially bias the first and second races 18, 20 toward the static axial position 22.

As can be seen in FIGS. 4-6, the second race 20 (e.g., outer race 32) may have an opposing pair of second race lateral sides 28. The second race lateral sides 28 may be of any shape or configuration such as the planar, ring-shaped configuration shown although other non-planar shapes of the second race lateral sides 28 are contemplated. The second race 20 may include an annular recess 64 which may be formed in at least one of the second race lateral sides 28 and which may be sized and configured to receive one or more of the biasing members 78 at least partially therewithin. The annular recess 64 may be radially located along the second race lateral side 28 adjacent to the bearing surface 40 thereof although the annular recess 64 may be formed at any radial location along the second race lateral sides 28 and is not limited to a location adjacent to the bearing surface 40. The annular recess 64 may define a recess outer wall 68 and a recess side wall 66 although the annular recess 64 may be formed in alternative geometries other than that which is shown in FIGS. 4-6. In the embodiment illustrated, the side washers 70 or annular flanges 72 of the first race 18 may be sized to have an outer dimension such as an outer diameter that is less than the diameter of the recess outer wall 68 such that a clearance fit is provided therebetween to facilitate axial motion of the first race 18 relative to the second race 20. However, the side washers 70 or annular flanges 72 may be provided with an outer diameter of any size regardless of the diameter of the recess outer wall 68.

Referring to FIGS. 4-6, in an embodiment of the roller assembly 10, the biasing members 78 may be configured to axially bias one of the first race lateral sides 26 away from an adjacent one of the second race lateral sides 28. In this regard, the biasing members 78 may be resiliently compressible to bias the first and second races 18, 20 toward the static axial position 22 as indicated above. However, it is also contemplated that the roller assembly 10 may comprise a single one of the biasing members 78 for biasing the first and second races 18, 20 toward the static axial position 22 upon displacement thereof to the dynamic axial position 24. In this regard, it is contemplated that the biasing member 78 may be configured and installed to provide a biasing force to the first and second races 18, 20 when the biasing member 78 is compressed and/or when the biasing member 78 is tensioned to bias the first and second races 18, 20 toward the dynamic axial position 24.

In an embodiment of the roller assembly 10 shown in FIGS. 4-6, at least one of the biasing members 78 may be mounted between one of the side washers 70 and an adjacent one of the second race lateral sides 28. Each one of the biasing members 78 may be configured to be resiliently compressible to axially bias one of the first race lateral sides 26 away from an adjacent one of the second race lateral sides 28. Toward this end, each one of the biasing members 78 may be configured as a ring-shaped element that is resiliently axially deflectable. For example, as shown in FIGS. 4-6, each one of the biasing members 78 may be configured as a conically-shaped Belleville washer 80 having inner and outer conical surfaces 92, 94. Furthermore, each one of the biasing members 78 may be formed as a stack or two or more Belleville washers 80 in a parallel arrangement 82 as shown in FIG. 7, in a series arrangement 84 as shown in FIG. 8 or in various combinations of parallel and series arrangements 82, 84 as described in greater detail below. Even further, the Belleville washers 80 may be installed such that the inner conical surface 92 faces outwardly as opposed to the arrangement shown in FIGS. 4-6 wherein the Belleville washer 80 is installed such that the outer conical surface 94 faces outwardly.

In an alternative embodiment, the biasing member 78 may be configured as one or more wave washers 86 as illustrated in FIG. 9 or as one or more spoke washers 88 as illustrated in FIG. 10. As known in the art, the wave washer 86 may have an undulating profile when viewed from the side and may be formed of a suitable material such as a metallic material such that the wave washer 86 is resiliently compressible. For example, the biasing member 78 (e.g., wave washer 86, Belleville washer 80, spoke washer 88) may be fabricated of stainless steel or of spring steel although the biasing member 78 may be fabricated of any suitable metallic or non-metallic material or combination thereof.

When mounted between the side washers 70 and the second race lateral sides 28 (i.e., in the annular recess 64), the wave washer 86 may be compressed to provide a biasing force. The spoke washer 88, as also known in the art, may be provided with radially extending spokes that provide a resiliently compressive capability to the spoke washer 88.

Although the biasing members 78 may provide a biasing force by virtue of their resilient compressibility, it is also contemplated that the biasing members 78 may be configured to provide a biasing force as a result of resilient extendability or tensionability. For example, each one of the biasing members 78 may be configured as a tension spring (not shown) that interconnects one of the first race lateral sides 26 to an adjacent one of the second race lateral sides 28 in order to bias the first race 18 and second race 20 from the dynamic axial position 24 as shown in FIG. 5 to the static axial position 22 shown in FIG. 4.

As shown in FIG. 11, in a further embodiment, each one of the biasing members 78 may be provided as a layer of resilient elastomeric material 90 that may be interposed between the side washer 70 and the second race lateral side 28. For example, the elastomeric material 90 may be ring-shaped and may have inner and outer diameters $ø_i$, $ø_o$ that are sized complementary to the annular recess 64 and/or to the side washers 70 although the elastomeric material 90 may be formed in any shape, size or configuration. The elastomeric material 90 may be formed of any material or any combination of materials and may have a thickness that is greater than an annular gap width $w_{gap}$ collectively defined by an interior surface 74 of one of the side washers 70 and an adjacent one of the recess side walls 66 such that the elastomeric material 90 on each one of the opposing race assembly lateral sides 16 may be pre-loaded. In a further embodiment, each one of the biasing members 78 may be provided as a coil spring (not shown) that may be mounted between the side washers 70 and the second race lateral side 28. As may be appreciated, the biasing member 78 may be configured in a wide variety of alternative embodiments suitable to provide a relative biasing force to the first and second races 18, 20.

As indicated above, each one of the biasing members 78 on each of the race assembly lateral sides 16 is preferably, but optionally, sized and configured to be installed in a pre-loaded or compressed state between one of the side washers 70 and the adjacent one of the second race lateral sides 28 when the first and second races 18, 20 are in the static axial position 22. Toward this end, the biasing member 78 may be formed with an inner perimeter 96 having an inner diameter $ø_i$ that provides a rotating fit of the biasing member 78 relative to the inner race 30. For example, as shown in FIGS. 4-5, the Belleville washer 80 configuration of the biasing member 78 has an inner diameter $ø_i$ that is preferably larger than the bearing member(s) 44 installed between the first and second races 18, 20 (i.e., inner and outer races 30, 32).

The bearing member 44 may have a width that is preferably at least as great as a width of the bearing surface 40 of the outer race 32. The second race 20 (i.e., inner race 30) may include the annular recesses 64 with recess side walls 66 and recess outer walls 68 on each of the second race lateral sides 28. The Belleville washer 80 or other biasing member 78 on each of the race assembly lateral sides 16 may have an outer perimeter 98 having an outer diameter $ø_o$ that facilitates centering of the biasing member 78 relative to the second race 20. By maintaining the biasing member 78 in a centered or coaxial position relative to the second race 20, the biasing force applied by the biasing member 78 may be uniformly distributed to an interior surface 74 of the side washer 70 to avoid eccentric loading thereof which may inhibit the free axial movement of the first race 18 relative to the second race 20.

Furthermore, the annular recess 64 may minimize the overall width of the roller assembly 10 by accommodating the biasing member 78 at least partially within the second race lateral sides 28. The interior surface 74 of the side washers 70 and the recess side walls 66 collectively define a width $w_{gap}$ within which the biasing member 78 (e.g., Belleville washer) may be mounted. The biasing member 78 may be sized and configured to have an uncompressed height $h_{Bi}$ that is greater than the annular gap width $w_{gap}$ on each of the race assembly lateral sides 16 such that each one of the biasing members 78 may be pre-loaded or compressed when the first and second races 18, 20 are in the static axial position 22. However, each one of the biasing members 78 on each of the race assembly lateral sides 16 may be sized and configured such that the biasing member 78 is unloaded (i.e., uncompressed) when the first and second races 18, 20 are in the static axial position 22. In such an arrangement, the biasing member 78 may be sized and configured to have an uncompressed height $h_{Bi}$ that is less than the annular gap width $w_{gap}$ on each of the race assembly lateral sides 16.

Referring to FIGS. 7 and 8, shown is the biasing member 78 in an alterative embodiment comprising a stacked formation of Belleville washers 80. FIG. 7 illustrates two of the Belleville washers 80 in a parallel arrangement 82 wherein adjacent ones of the Belleville washers 80 are oriented in the same direction. More specifically, in the parallel arrangement 82, the inner conical surface 92 of one of the Belleville washers 80 is positioned adjacent to or in abutting contact with the outer conical surface 94 of an adjacent one of the Belleville washers 80. Each one of the Belleville washers 80 has an uncompressed height $h_{Bi}$. The Belleville washers 80 may have a total uncompressed stack height $h_T$ comprising a sum of the uncompressed height $h_{Bi}$ of one of the Belleville washers 80 and a thickness of the remaining ones of the Belleville washers 80 in the stack.

FIG. 8 illustrates two of the Belleville washers 80 in a series arrangement 84 wherein adjacent ones of the Belleville washers 80 are oriented in the opposite directions. More specifically, in the series arrangement 84, the inner conical surface 92 of at least one of the Belleville washers 80 is oriented in back-to-back arrangement with the inner conical surface 92 of an adjacent one of the Belleville washers 80 or the outer conical surface 94 of at least one of the Belleville washers 80 is oriented in back-to-back arrangement with the outer conical surface 94 of an adjacent one of the Belleville washers 80. Although only two of the Belleville washers 80 are shown in each of the parallel and series arrangements 82, 84 of FIGS. 7 and 8, respectively, any number may be provided.

Referring to FIGS. 3-8, the number of Belleville washers 80 or other biasing member 78 configurations that may be arranged in a stack formation may be selected based upon the width $w_{gap}$ of the annular gap 76 between the side washer 70 and the recess side wall 66. In this regard, the first and second races 18, 20 may be configured to provide an annular gap 76 that facilitates axial displacement of the first race 18 relative to the second race 20 by an amount that prevents lateral motion of the roller surface 52 relative to the track surface 122 to which the roller surface 52 may be engaged. For example, in the context of a flap 114 of an aircraft 100, the flap 114 may be subjected to a lateral flap displacement $\Delta_F$ as a result of vibration of the flap 114 due to aerodynamic forces acting thereupon and/or due to engine thrust impingement or other forces. The lateral flap displacement $\Delta_F$ may result in an applied axial load $P_A$ on the inner race 30 to which the flap 114 may be connected such as by means of the flap carriage 118.

The applied axial load $P_A$ may cause the first race 18 to axially move relative to the second race 20 by a race relative axial displacement indicated as $\Delta_R$ in FIG. 5. For example, the lateral flap displacement $\Delta_F$ may be approximately 0.045 inches. At least one of the biasing members 78 on one of the opposing race assembly lateral sides 16 may provide an axial deflection $\Delta_{Bi}$ in an amount that accommodates axial displacement of the outer race 32 relative to the inner race 30. More specifically, the biasing members 78 may provide an axial deflection $\Delta_{Bi}$ in an amount that is at least as large as the amount of lateral flap displacement $\Delta_F$. For example, to accommodate the lateral flap displacement $\Delta_F$, the biasing member 78 may comprise a stack of three (3) Belleville washers 80 in a parallel arrangement 84 (i.e., the Belleville washers 80 facing in alternating directions) as shown in FIG. 8. Each one of the Belleville washers 80 in the stack may provide a deflection amount of 0.015 inches for a collective axial deflection $\Delta_{Bi}$ of 0.045 inches.

The axial load applied to the inner race 30 may result in a static frictional force F at the roller-track interface 132. The magnitude of the static frictional force F at the roller-track interface 132 may be dependent in part upon the coefficient of static friction between the roller surface 52 and the track surface 122 as well as the magnitude of an applied normal load $P_N$ at the roller-track interface 132. In an embodiment of the roller assembly 10, the biasing member 78 may be sized and configured to deflect at loads below the static frictional force F to facilitate axial motion of the first race 18 relative to the second race 20. Furthermore, by selectively arranging the Belleville washers 80 in series, in parallel or in combinations thereof and by selecting the deflection capabilities and spring constants of the Belleville washers 80, the biasing member 78 may be configured to accommodate the relative axial displacement of the first and second races 18, 20. Even further, each one of the biasing members 78 may be arranged as combinations of different types of biasing members 78. For example, it is contemplated that one of the biasing members 78 on one of the race assembly lateral sides 16 may be comprised of one or more Belleville washers 80 combined with one or more layers of elastomeric material 90.

Referring to FIG. 5, upon application of the applied axial load $P_A$, the first race 18 may be axially displaced relative to the second race 20 such that the race assembly 14 is moved to the dynamic axial position 24 as shown causing the biasing members 78 to cooperatively bias the first and second races 18, 20 back toward the static axial position 22 (i.e., the unbiased position) such as that which is shown in FIG. 4. In this regard, in the dynamic axial position 24, at least one of the biasing members 78 may urge the first and second races 18, 20 back toward the static axial position 22. It should be noted that the dynamic axial position 24 of the first and second races 18, 20 as shown in FIG. 5 is representative of one of a plurality of different dynamic axial positions 24 that the first and second races 18, 20 may assume depending upon the magnitude of the lateral flap 114 displacement $\Delta_F$ and the axial load $P_A$ applied to the inner race 30 as shown in FIGS. 3-5.

For example, although FIG. 5 illustrates the second race 20 as being axially displaced relative to the first race 18 such that the biasing member 78 on one side of the roller assembly 10 is fully compressed or substantially flattened, the dynamic axial position 24 may comprise a position wherein the biasing member 78 on one side of the roller assembly 10 is partially compressed such as wherein the biasing member 78 is compressed by one-half of the total available amount of compression thereof. In this regard, each one of the biasing members 78 is preferably sized and configured to accommodate a predetermined amount of axial displacement of the first relative to the second races 18, 20.

In operation, embodiments of the disclosure may be described in the context a method of accommodating axial motion of the first race 18 relative to the second race 20. As was indicated above, the first race 18 may comprise the outer race 32 and the second race may comprise the inner race 30, or vice versa. The first and second races 18, 20 may comprise a race assembly 14 of the roller assembly 10 as described above. The method may comprise the step of moving the first race 18 axially relative to the second race 20 by a predetermined amount from the static axial position 22 toward the dynamic axial position 24. The movement from the static axial position 22 toward the dynamic axial position 24 may occur as a result of an applied axial load $P_A$ on the first race 18. For example, as indicated above, the applied axial load $P_A$ may occur as a result of lateral movement or vibration of a control surface 112 such as the flap 114 to which the roller surface 52 may be connected by means of the flap carriage 118 as shown in FIGS. 2-3.

The method may further comprise the step of biasing the first and second races 18, 20 from the dynamic axial position 24 toward the static axial position 22. Such biasing may be provided by one or more of the biasing members 78. For example, as shown in FIGS. 3-5, a pair of the biasing members 78 may be positioned on respective ones of the race assembly lateral sides 16 and may cooperate to dampen the relative axial motion of the first and second races 18, 20 for controlled axial displacement of the first race 18 relative to the second race 20. In one embodiment, each one of the biasing members 78 may be comprise of one or more Belleville washers 80 configured to bias one of the first race lateral sides 26 away from an adjacent one of the second race lateral sides 28.

As illustrated in FIGS. 2-3, the roller surface 52 may be positionable in rolling contact with the track surface 122 such that the roller surface 52 and the track surface 122 define the roller-track interface 132. The method may further comprise the steps of applying the axial load $P_A$ to the first race 18 to cause the static frictional force F at the roller-track interface 132 and causing deflection of the biasing member 78 at a load below the static frictional force F to prevent axial movement of the roller surface 52 relative to the track surface 122. In this manner, the roller assembly 10 may avoid the expense and labor involved in repairing the track surface 122 and/or replacing the flap track 120 or other track member to which the roller assembly 10 may be placed in rolling contact.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A roller assembly, comprising:
   a race assembly:
      an inner race having a bearing surface; and
      an outer race having a bearing surface and being coaxial with and axially movable relative to the inner race from a static axial position toward a dynamic axial position;
      a bearing member being mountable within a radial gap between the bearing surfaces, the bearing member having a width that is at least as great as a width of the outer race; and
   at least one biasing member operative to bias the inner and outer races from the dynamic axial position toward the static axial position.

2. The roller assembly of claim 1 wherein:
   the race assembly has opposing race assembly lateral sides;
   the biasing member comprising a pair of biasing members positioned on respective ones of the race assembly lateral sides;
   the biasing members cooperating to bias the inner and outer races toward the static axial position.

3. The roller assembly of claim 2 wherein:
   each one of the biasing members is pre-loaded when the inner and outer races are in the static axial position.

4. The roller assembly of claim 2 wherein:
   the inner race has opposing inner race lateral sides;
   the outer race has opposing outer race lateral sides;
   each one of the biasing members being configured to axially bias one of the inner race lateral sides away from an adjacent one of the outer race lateral sides.

5. The roller assembly of claim 1 wherein:
   the outer race has a roller surface positionable in rolling contact with a track surface and defining a roller-track interface;
   the inner race being adapted to have an axial load applied thereto causing a static frictional force at the roller-track interface;
   the biasing member being configured to deflect at loads below the static frictional force.

6. The roller assembly of claim 1 wherein the biasing member is configured as one of the following:
   a Belleville washer, a wave washer, a spoke washer, a layer of elastomeric material.

7. The roller assembly of claim 1 wherein:
   the biasing member comprises at least two Belleville washers provided in stacked formation in at least one of the following arrangements:
      a parallel arrangement wherein adjacent ones of the Belleville washers are oriented in the same direction; and
      a series arrangement wherein adjacent ones of the Belleville washers are oriented in opposite directions.

8. A roller assembly, comprising:
   an inner race having opposing inner race lateral sides and a bearing surface;
   an outer race coaxial to the inner race and being axially movable relative thereto, the outer race having opposing outer race lateral sides and a bearing surface;
   a pair of biasing members, each one of the biasing members being operative to bias one of the inner race lateral sides away from an adjacent one of the outer race lateral sides; and
   a bearing member being mountable within a radial gap between the bearing surfaces, the bearing member having a width that is at least as great as a width of the outer race.

9. The roller assembly of claim 8 wherein:
   the inner race includes a side washer mountable on at least one of the inner race lateral sides;
   one of the biasing members of the pair being interposed between the side washer and the adjacent one of the outer race lateral sides and being configured to bias the side washer away from the outer race lateral side.

10. The roller assembly of claim 9 wherein:
    at least one of the outer race lateral sides includes an annular recess sized and configured to receive one of the biasing members.

11. The roller assembly of claim 8 wherein:
    each one of the biasing members is pre-loaded when the inner and outer races are in the static axial position.

12. The roller assembly of claim 9 wherein at least one of the biasing members is configured as one of the following:
    a Belleville washer, a wave washer, a spoke washer, a layer of elastomeric material.

13. The roller assembly of claim 8 wherein:
    the outer race has a roller surface positionable in rolling contact with a track surface and defining a roller-track interface;
    the inner race being adapted to have an axial load applied thereto and causing a static frictional force at the roller-track interface;
    at least one of the biasing members being configured to deflect at loads below the static frictional force.

14. An aircraft, comprising:
    a roller assembly, including:
       an inner race having a bearing surface; and
       an outer race having a bearing surface and being coaxial with and axially movable relative to the inner race from a static axial position toward a dynamic axial position;
       a bearing member being mountable within a radial gap between the bearing surfaces, the bearing member having a width that is at least as great as a width of the outer race; and
    at least one biasing member operative to bias the inner and outer races from the dynamic axial position toward the static axial position.

15. The aircraft of claim 14 further comprising:
    a track assembly including a flap track having at least one track surface;
    wherein:
       the outer race has a roller surface positionable in rolling contact with the track surface.

16. The aircraft of claim 15 further comprising:
    a control surface engageable to the roller assembly.

17. The aircraft of claim 16 wherein the control surface comprises a flap.

18. The aircraft of claim 17 wherein:
the flap is laterally movable relative to the flap track and defining a lateral flap displacement;
the biasing member being configured to accommodate axial displacement of the inner race relative to the outer race by an amount at least equal to the lateral flap displacement.

19. A method of accommodating axial motion of a inner race relative to a outer race, the method comprising the steps of:
providing the inner race with a bearing surface;
providing the outer race with a bearing surface;
mounting a bearing member within a radial gap between the bearing surfaces, the bearing member having a width that is at least as great as a width of the outer race;
moving the inner race axially relative to the outer race by a predetermined amount from a static axial position toward a dynamic axial position; and
biasing the inner and outer races from the dynamic axial position toward the static axial position.

20. The method of claim 19 wherein:
the inner race has opposing first inner race lateral sides;
the outer race having opposing outer race lateral sides;
the biasing member comprising a pair of biasing members;
each one of the biasing members of the pair being disposed on respective ones of the inner race lateral sides and an adjacent one of the outer race lateral sides.

21. The method of claim 20 wherein the step of biasing the inner and outer races from the dynamic axial position toward the static axial position comprising:
biasing each one of the inner race lateral sides away from an adjacent one of the outer race lateral sides.

22. The method of claim 19 wherein the outer race has a roller surface positionable in rolling contact with a track surface and defining a roller-track interface, the method further comprising the steps of:
applying an axial load to the inner race to cause a static frictional force at the roller-track interface; and
deflecting the biasing member at a load below the static frictional force.

* * * * *